(12) United States Patent
Fiekers (10) Patent No.: US 10,527,404 B2
(45) Date of Patent: Jan. 7, 2020

(54) AUTO-FOCUS METHOD FOR A COORDINATE MEASURING DEVICE

(71) Applicant: CARL ZEISS INDUSTRIELLE MESSTECHNIK GMBH, Oberkochen (DE)

(72) Inventor: Christian Fiekers, Oberkochen (DE)

(73) Assignee: CARL ZEISS INDUSTRIELLE MESSTECHNIK GMBH, Oberkochen (DE)

(*) Notice: Subject to any disclaimer, the term of this patent is extended or adjusted under 35 U.S.C. 154(b) by 559 days.

(21) Appl. No.: 15/338,793

(22) Filed: Oct. 31, 2016

(65) Prior Publication Data

US 2017/0045350 A1 Feb. 16, 2017

Related U.S. Application Data

(63) Continuation of application No. PCT/EP2015/058444, filed on Apr. 17, 2015.

(30) Foreign Application Priority Data

May 19, 2014 (DE) .................. 10 2014 107 044

(51) Int. Cl.
*G01C 3/08* (2006.01)
*G01B 11/00* (2006.01)
*G01B 11/02* (2006.01)

(52) U.S. Cl.
CPC .......... *G01B 11/005* (2013.01); *G01B 11/026* (2013.01)

(58) Field of Classification Search
CPC .. G01B 21/047; G01B 11/005; G01B 11/026; G02B 7/28

USPC ........................................... 356/4.01
See application file for complete search history.

(56) References Cited

U.S. PATENT DOCUMENTS

2015/0103156 A1* 4/2015 Northrup ............. G02B 21/365
348/79
2015/0260504 A1* 9/2015 Schonleber ........ G01B 9/02091
356/478

FOREIGN PATENT DOCUMENTS

| DE | 102 15 135 A1 | 10/2002 |
| DE | 10 2005 009 554 A1 | 9/2006 |
| DE | 10 2007 003 059 A1 | 7/2008 |
| DE | 10 2007 039 981 A1 | 2/2009 |
| DE | 10 2009 027 353 A1 | 2/2010 |
| DE | 10 2011 116 734 A1 | 4/2013 |

(Continued)

OTHER PUBLICATIONS

Peter Hamm; Inhaltsbasierte Autofokussierung in der automatisierten Mikroskopie; 2011; 105 pp.

(Continued)

*Primary Examiner* — Mark Hellner
(74) *Attorney, Agent, or Firm* — Harness, Dickey & Pierce, P.L.C.

(57) ABSTRACT

The present invention relates to a method for ascertaining a focus image distance of an optical sensor, which is provided with a lens, of a coordinate-measuring machine onto a workpiece to be measured, wherein the optical sensor and the workpiece are movable relative to one another in a Z direction such that a distance in the Z direction between the workpiece and the optical sensor is variable. The present invention furthermore relates to a corresponding coordinate-measuring machine and to a computer program product.

22 Claims, 5 Drawing Sheets

(56) References Cited

FOREIGN PATENT DOCUMENTS

WO     WO 2006/125466 A1     11/2006
WO     WO 2014/023780 A1     2/2014

OTHER PUBLICATIONS

English language translation of International Preliminary Report on Patentability (Chapter I) for PCT/EP2015/058444; dated Nov. 22, 2016; 9 pp.
German Examination Report (with English translation); dated Feb. 9, 2015; 12 pp.

* cited by examiner

AUTO-FOCUS METHOD FOR A COORDINATE MEASURING DEVICE

CROSS-REFERENCE TO RELATED APPLICATIONS

This is a Continuation application of International patent application PCT/EP2015/058444, filed Apr. 17, 2015, which claims priority of German patent application DE 10 2014 107 044.5, filed May 19, 2014. The entire contents of these priority applications are incorporated herein by reference.

BACKGROUND OF THE INVENTION

The present invention relates to a method for ascertaining a focused image distance of an optical sensor of a coordinate-measuring machine onto a workpiece to be measured, wherein the optical sensor and the workpiece are movable relative to one another in a Z direction such that a distance in the Z direction between the workpiece and the optical sensor is variable.

The present invention furthermore relates to a coordinate-measuring machine having an optical sensor and a control device for focusing the optical sensor.

Coordinate-measuring machines are generally known in the prior art. They serve for checking workpieces, for example as part of quality assurance, or for ascertaining the geometry of a workpiece completely as part of what is known as "reverse engineering." Moreover, multifarious further application possibilities are conceivable.

In coordinate-measuring machines of this type, different types of sensors can be used to capture the coordinates of a workpiece to be measured. By way of example, sensors that measure in tactile fashion are known in this respect, as are sold for example by the applicant under the name "Vast XT" or "VAST XXT." Here, the surface of the workpiece to be measured is probed with a stylus, with the coordinates of the stylus within the measurement space being constantly known. Such a stylus can also be moved along the surface of a workpiece, with the result that a multiplicity of measurement points can be captured at fixed time intervals during such a measurement operation as part of what is known as a "scanning method."

It is furthermore known to use optical sensors that permit contactless capturing of the coordinates of a workpiece. One example of such an optical sensor is the optical sensor sold by the applicant under the name "ViScan".

The sensors can then be used in different types of measurement constructions. One example of such a measurement construction is the product "O-Inspect" by the applicant. In a device of this type, both an optical sensor and a tactile sensor are used to perform various examination tasks on a machine and ideally with a single setup of a workpiece to be measured. In this way it is possible to simply perform all the examination tasks for example in medical technology, plastics technology, electronics and precision engineering. Various other constructions are, of course, also conceivable.

In one device, such as for example the "O-Inspect," the measured workpiece is set up on a table. The table here forms an XY plane. The optical sensor is spaced apart from the workpiece to be measured perpendicularly from this plane, i.e. in the Z direction of a Cartesian coordinate system. The optical sensor should be focused onto the workpiece to be measured in dependence on the workpiece to be measured and the relative position of the optical sensor and the table with respect to one another. What applies generally here for all XY positions of the table is focusing in the Z direction.

Focusing is performed automatically by the coordinate-measuring machine. As is known, this is done by a user first manually moving the optical sensor to a position or a distance from the workpiece to be measured where he expects approximately a maximum sharpness or focus on the workpiece. He will then specify a search region in the form of a length specification or a separation in the Z direction within which the search for the maximum sharpness or best focus is to be carried out.

The camera is then moved further away from the workpiece to be measured by half of the specified search region and then moves very slowly to the end of the search region toward the workpiece. During this camera movement, images of this workpiece are captured using the optical sensor at specific time intervals and retrieved from the optical sensor by the coordinate-measuring machine. During an evaluation, what is known as a focus value of a specific region of the retrieved image is ascertained, and the position or the distance from the workpiece to be measured, in which the image request was sent, is stored together with the focus value. The multiplicity of focus values thus ascertained and the respectively associated distances from the workpiece to be measured can be used to plot what is known as a focus value curve. The coordinate-measuring machine is then able to determine an extreme value of this curve. The distance that is associated with that extreme value then represents the distance where the maximum sharpness or the best focus of the optical sensor occurs, and the optical sensor is set to this distance from the workpiece to be measured.

A multiplicity of methods are known within the prior art that can determine a focus value. For example, a region of the images can be chosen for the evaluation within which an edge of a workpiece to be measured is located. A very abrupt color transition or bright-dark transition is then located in this region. A focus value can then be, for example, the maximum gradient of the grayscale levels of the image perpendicular to the edge. The sharper an image, the greater the gradient, since ideally an abrupt transition from bright to dark occurs from one pixel to the next. The less sharp the image is, the more continuous is the bright-dark transition and the lower is the gradient. Of course, many further possibilities for determining a focus value are conceivable and known.

If owing to the system there is no possibility in such a method of directly assigning a respective image the exact distance at which it was recorded, the result may be inaccuracies in the distance determination. During a continuous camera movement through the search region, the time of use of an image requested from the optical sensor by the coordinate-measuring machine image never matches the time at which the optical sensor actually recorded the image that was supplied in response to the request. One solution in this respect was proposed for example in the document DE 10 2011 116 734 A1.

A further possibility for setting the ascertainment of an optimum focus of an optical sensor is disclosed for example in document DE 10 2009 027 353 A1. A normalized focus value curve is stored here for the specific optical sensor. As a result it is possible, even with a small number of recordings, to ascertain an instantaneous position of the optical sensor on the normalized focus value curve and to bring the optical sensor then into a position which corresponds to an optimum position on the normalized focus value curve. While it is possible in this way to provide relatively quick autofocusing, generally the accuracy requirements needed in coordinate measuring technology are not met. Moreover, this document discloses several examples of determining focus values.

Moreover, several further possibilities for increasing the accuracy of a method for determining the best possible focusing of an optical sensor have been proposed.

For example, document DE 10 2007 039 981 A1, which was mentioned in the introductory part, proposes to "fit" the ascertained focus values with a function in a specific region of the focus value curve and to then evaluate this curve.

It is furthermore known, for example from documents DE 102 15 135 A1 and DE 10 2007 003 059 A1, to ascertain a plurality of different focus criteria in an image and to sum them up or to take a weighted average so as to ascertain with the highest possible degree of accuracy the location of the distance of maximum sharpness.

Furthermore, documents 10 2005 009 554 A1 and WO 2006/125466 A1 disclose different proposals for determining focus values of recorded image stacks.

Document WO 2014/023780 A1 discloses a coordinate-measuring machine having a workpiece holder for holding a measurement object, and a measurement head that is movable relative to the workpiece holder. The measurement head carries an optical sensor. An evaluation and control unit is configured to determine spatial coordinates on the measurement object in dependence on a position of the measurement head relative to the workpiece holder and in dependence on sensor data of the optical sensor. The optical sensor includes a lens and a camera. The lens has a stop and at least 4 separate lens element groups, three of which are individually displaceable along the optical axis of the lens. The stop is furthermore also individually displaceable along the optical axis. A first lens element group is arranged fixedly in the region of the light-entry opening of the lens. A coordinate-measuring machine having such a lens permits the variation of magnification, focusing, resolution and others across a wide area of application.

Such sensors are distinguished in particular by being able to operate at many different working distances between the optical sensor and the workpiece. Moreover, they are able to operate with different, arbitrarily selected magnifications. Among other things, this also permits without problems measurement of workpieces having relatively large height differences. At the same time it has the consequence that the space region in which a plane of best focus can be located becomes relatively large in principle. It is more difficult for a user to estimate in advance whereabouts the plane of best focus will be located. As a result it becomes necessary to initially set a relatively large "catchment region" to ensure that the plane of best focus is located within this catchment region. The catchment region here refers to the region across which a search for the plane of best focus is started.

However, a relatively large catchment region has so far been associated with two disadvantages. One, it takes a relatively long time until a plane of best focus is found, since a relatively large distance needs to be traveled. Second, the reproducibility of the result for the plane of best focus decreases. This could be countered by increasing the number of recordings within the catchment region and/or reducing the speed at which the catchment region is traveled. However, this results in a further increase of the time needed for the autofocusing. Consequently, it is either possible to achieve only very slow focusing, or it is necessary to limit a maximum size of the catchment region, which is undesired and carries the risk that the plane of best focus is actually located outside the catchment region.

SUMMARY OF THE INVENTION

Against this background, it is a technical object of the present invention to provide a method for ascertaining a focused image distance of an optical sensor of a coordinate-measuring machine and a coordinate-measuring machine, in which the ascertainment of the best possible focused image distance is performed as quickly as possible with reproducible and great accuracy even for large catchment regions.

According to a first aspect of the invention, a proposal is therefore made to develop the method mentioned in the introductory part further by way of the following steps:
  a) specifying a catchment region having a starting distance (34) and an end distance, which have between them a maximum interval length;
  b) determining a minimum interval length in dependence on a depth of field of the lens;
  c) determining at least one further interval length starting from the minimum interval length, wherein starting from the minimum interval length in each case a next greater interval length is specified by multiplication by a scaling factor until the next greater interval length is equal to or greater than the maximum interval length;
  d) varying the distance between the workpiece and the optical sensor from the starting distance in the direction of the end distance, wherein the optical sensor captures images of the workpiece during the varying of the distance, and wherein each captured image is assigned a focus value and an image distance;
  e) determining the focus image distance at which the focus value between the starting distance and the end distance assumes an extreme value;
  f) specifying a new starting distance and a new end distance, wherein the new starting distance and the new end distance have a next smaller interval length between them, and a center of the next smaller interval length is the focus image distance;
  g) repeating steps d) to f) until a focus image distance in the minimum interval length has been determined.

The relative movement between the optical sensor and the variation in distance can here take place by way of holding the optical sensor in place and moving a table on which the workpiece is arranged in the Z direction. The Z direction is here perpendicular to the table or to the workpiece. A separation between the optical sensor and the workpiece in the Z direction thus represents the distance between the optical sensor and the workpiece.

However, provision may also be made for the table or the workpiece to be fixed and the optical sensor to move. Provision may ultimately also be made of course for both the optical sensor and the workpiece to move. What is important is to vary the distance, i.e. the separation between the optical sensor and the workpiece in the Z direction.

With the proposed method, it becomes possible, starting from a catchment region of arbitrary size, to ascertain a precise best focus with constant reproducibility. In a coordinate-measuring machine, this then helps to achieve measurement results reproducibly and precisely with this setting for the plane of the sharpest image. The magnification of a lens can be arbitrarily set and is known. The catchment region can also be set to be of arbitrary size. For the coordinate-measuring machine, what is referred to as image-position matching, i.e. the assignment of the image of the camera in space via the known position of the measuring machine and thus of the optical sensor, is likewise known. Catchment regions having a size of 20 to 30 mm up to the complete working distance are capable of being processed without difficulty with a continued high speed. The term "magnification" in this case refers to the usual meaning in optics, specifically the ratio between the size of the image and the true size of an object. Relevant in particular is here also the axial magnification, i.e. the magnification along the optical axis, since it influences the depth of field. Since this is, strictly speaking, defined only within the paraxial region, i.e. the optical space near the axis, the term "magnification" in general is used.

The proposed solution is based on initially specifying, in dependence on a depth of field of the lens, a minimum interval length within which a best focus value or the location of the plane of best focus can still be determined with greatest accuracy. This minimum interval length is very short in principle, such that it can be traveled relatively slowly to record a relatively high number of images within the minimum interval length and to determine the location of the focus image distance, i.e. the plane of the best focused image. Said minimum interval length can thus be traveled relatively slowly and, in other words, with high resolution, i.e. with a small distance between the planes of two neighboring images of an image stack. This does not apply to the catchment region specified in the introduction. The interval length of the catchment region is very large. In order to keep the speed of the entire method high, said region must be traveled very quickly, as a result of which only relatively few images per path section can be recorded and the determination of the best focus value is thus still relatively inaccurate.

An "interval length" here always refers to the path section to be traveled between a starting distance and an end distance.

The proposed method now links the catchment region to the minimum interval length such that the interval length to be traveled is reduced incrementally from the catchment region to the minimum interval length. The proposed method here provides for the respectively next smaller interval length to always be positioned such, and for its size to be selected such, that the actual plane of the sharpest image remains within the interval length. The interval lengths are here determined in advance starting from the minimum interval length, as will be described below in more detail. Starting from an intermediate result, specifically in each case the location of the image plane having the best focus value or the plane of the sharpest image for a specific interval length, the location of said plane is determined as the center for the next smaller interval length.

This allows the very large catchment region initially to be traveled at high-speed and with a relatively small number of images, i.e. a low resolution, and at the same time a minimum interval length to be traveled at a very low speed, but with a relatively large number of images, i.e. a high resolution, wherein it is ensured that the positioning of the minimum interval length was done such that the plane of the sharpest image is actually located therein. What applies to any interval lengths determined between the original catchment region of the minimum interval length is then that their length from the catchment region to the minimum interval length decreases successively. The speed at which the decreasing interval lengths are traveled can here, in dependence on a frame rate of the optical sensor and the selected number of images to be recorded over the interval length, reduce, but not necessarily so. Even a reduction in speed would not be critical, however, since the path section to be traveled, the interval length, likewise decreases.

In particular, the number of images to be recorded over an interval length is selected to be constant. As a consequence, starting from the catchment region with a relatively low number of images and a high-speed and thus low resolution and accuracy, the resolution and accuracy successively increases as interval lengths decrease. Since the interval lengths decrease, the necessary time periods do not increase significantly despite ultimately reducing speeds. Since the center of a respectively next smaller interval length is always positioned in the plane of the sharpest image that is found within the next larger interval length, it is possible to ensure that a next smaller interval length in each case still contains the actual plane of the sharpest image, and this plane is approached successively with continually increasing accuracy. It is thus possible, with great consistency and a catchment region that is selected to be of arbitrary size, to achieve reproducibilities in a region of less than 3 μm.

The exact ascertainment of the individual parameters will be explained below in more detail. Typical examples of boundary conditions can be the recording of approximately 20 images per interval length in an optical sensor which can record approximately 30 images per second as frame rate. Three to four times the depth of field can be selected; it can for example be approximately in a region of 40 μm as the minimum interval length. The scaling factor for ascertaining a staggered configuration of the interval lengths can then be approximately 6.67, which results from the division of the number of images per interval length, specifically 20, by a target width, for example likewise expressed in the number of images, specifically 3, in which the location of the actual plane of the sharpest image can be assumed.

Initially, the magnitude of the depth of field which is dependent on the wavelength of the light is thus calculated from the set magnification and a numerical aperture of the lens, which are both known. The equations used for calculating this depth of field will be explained below in more detail. In particular, it is possible to first determine, from a known image-side numerical aperture and the magnification, the object-side numerical aperture and then, on the basis of a reference wavelength, the depth of field.

Depth of field refers to the length the optical sensor can travel in the direction of the optical axis over with the ascertained image still gives approximately the same sharper impression.

This ascertained value of the depth of field leads to the basis for the calculation of the minimum interval length necessary for moving the machine to ensure the best reproducibility of the determination of the plane of the sharpest image. By way of example, the minimum interval length can be set to be two or three times the magnitude of the depth of field. Starting from this minimum interval length, it is possible to ascertain the length of the next greater interval by way of scaling with a scaling factor. With respect to the ascertainment of the scaling factor, further details are likewise given below. The scaling factor is always greater than 1 and is dependent on the number of images captured per interval length and of a value for a target region, that is to say for example the number of portions of an interval length in which the plane of the sharpest image can actually be assumed to be located. This is repeated until a thus determined next greater interval region corresponds to the length of the catchment region or exceeds it. The length of the catchment region in each case indicates the length of the maximum interval length, i.e. that interval length which is traveled first. For example, if an interval length were to be longer than that of the catchment region, it would be discarded and replaced with the catchment region, and at this point the determination of the interval lengths would be interrupted. All the interval lengths are then determined and can be traveled, starting with the maximum interval length, successively, "backwards" as it were, up until and including the minimum interval length. Consequently, during the performance of the actual autofocusing operation and starting from the catchment region or the minimum interval length, travel takes place from a starting position to an end position, and the sharpest image or interpreted sharpest image captured during this movement is ascertained. The corresponding distance of this image is then determined initially as the location of the plane of the sharpest image and forms the center for the next smaller interval, as a result of which a new starting distance and a new end distance can be determined. Then, starting from the instantaneously determined plane of the sharpest image, half of the next smaller interval length is located in the positive Z direction, i.e. away from the workpiece, and half of the next smaller interval length is located in the negative Z direction, i.e. in the direction of the workpiece. This region is then traveled and the required number of images is ascertained in this next smaller interval, then the plane of the sharpest image is determined again, and, starting from this, the next smaller interval length is in turn positioned such that a new starting distance and a new end distance are obtained again, and so on. This is continued until the minimum interval length has been traveled and the plane of the sharpest image, which was ascertained in the process, ultimately forms the result for the method.

According to a second aspect of the invention, a proposal is made for the initially mentioned coordinate-measuring machine to be developed further to the effect that the control device is set up for performing a method according to the first aspect of the invention.

According to a third aspect of the invention, a computer program product is moreover provided with a computer program which has program code means for performing a method according to the first aspect of the invention if the computer program is executed on a coordinate-measuring machine or a data processing apparatus of a coordinate-measuring machine, which in particular can also be connected as an external unit to the coordinate-measuring machine, or a control device of a coordinate-measuring machine.

The coordinate-measuring machine according to the second aspect of the invention and the computer program product according to the third aspect of the invention have the same advantages as the method according to the first aspect of the invention.

In one refinement of the method, provision may be made for the interval length to be divided into in each case an equal number of portions of equal size during step d) and for an image to be captured in each portion, in particular in a way such that the number of captured images over each interval length is identical.

It is thus possible, for example, to provide that for each interval length 20 images are to be recorded. In principle, the number of the images to be captured can also be selected to be different, in particular in a range of 5 to 250 images, preferably 10 to 50 images, further preferred 20 to 30 images. In this way it is ensured that in the relatively large interval lengths, in particular in the initial catchment region, in dependence on a frame rate of the optical sensor, the correspondingly large interval length can be traveled at a relatively high speed. This is completely sufficient, because initially only a rough determination of the location of the plane of the greatest image sharpness is needed. The resolution of the image capturing over the interval length thus achieved can thus be very low. However, at the same time, the number of recorded images, the resolution with which the images are captured, is relatively large in the smaller interval lengths, in particular in the minimum interval length. Of course it might be necessary to reduce the speed of travel in dependence on the frame rate of the optical sensor. However, this is more than made up for because of the relatively short interval lengths.

In one further refinement of the method, provision may be made for the minimum interval length to be determined in step b) pursuant to $$L_{min} = a \cdot DOF$$

wherein $L_{min}$ is the minimum interval length, a is a factor and DOF is the depth of field of the lens. It thus becomes possible in a simple manner to specify the minimum interval length in dependence on a depth of field of the optical sensor in the selected setting. In particular, a is greater than 1.

In one refinement of the method, provision may be made for the factor a to lie in a range $1 \leq a \leq 5$, preferably in a range $2 \leq a \leq 4$, with further preference to be 3.

It has been shown that roughly three times the depth of field should form the minimum interval length so as to permit determination of the location of the plane of the sharpest image with an accuracy that is high for the coordinate measurement.

In one refinement of the method, provision may be made for the lens to be a zoom lens which is telecentric on both sides.

Such a lens not only permits operation with different magnifications, but, owing to the two-sided telecentricity, accurate capturing over a large region of working distances. In particular, it is possible to keep the image-side numerical aperture constant. For example, it may be constantly 0.032.

In one refinement of the method, provision may be made for the depth of field of the lens to be determined pursuant to $$DOF = \frac{\lambda}{(NA \cdot V)^2}$$

wherein DOF is the depth of field of the lens, V is the magnification of the lens, in particular axial magnification, NA is the image-side numerical aperture at the magnification, and $\lambda$ is a reference wavelength.

The following table gives an example of how, in an optical sensor that has a constant image-side numerical aperture of 0.032, the depth of field at a reference wavelength of 550 nm is obtained in dependence on the magnification.

| Image-side numerical aperture [—] | magnification | Object-side numerical aperture [—] | Depth of field [m] Reference wavelength [m] 0.00055 |
|---|---|---|---|
| 0.032 | 0.4 | 0.0128 | 3.356933594 |
| 0.032 | 0.7 | 0.0224 | 1.096141582 |
| 0.032 | 1 | 0.032 | 0.537109375 |
| 0.032 | 2 | 0.064 | 0.134277344 |
| 0.032 | 2.2 | 0.0704 | 0.110973011 |
| 0.032 | 2.65 | 0.0848 | 0.076484069 |
| 0.032 | 3.2 | 0.1024 | 0.052452087 |
| 0.032 | 4 | 0.128 | 0.033569336 |
| 0.032 | 6.25 | 0.2 | 0.01375 |

The product is here formed from the image-side numerical aperture and the magnification of the object-site aperture, so that: object-side aperture=image-side numerical aperture×magnification. With a known, in particular constant, image-side numerical aperture of a specified reference wavelength, which can in particular be specified for 550 nm, it is thus possible only in dependence on the set magnification V to determine the depth of field and, from this depth of field, the minimum interval length. This permits simple and quick ascertainment of the minimum interval length. In particular, the depth of field and/or the minimum interval length can thus be directly determined systematically with stipulation of a specific magnification and be kept for further use.

In one refinement of the method, provision may be made for the reference wavelength to lie in a range 400 nm≤λ≤650 nm, preferably to be 550 nm.

In particular, the reference wavelength should lie within the spectral range of the light sources of the coordinate-measuring machine. A wavelength of 550 nm in principle is approximately in the center of the spectral range that is visible to humans, in particular the spectral range between 380 nm and 780 nm, and can thus be preferred in the case of corresponding light sources. However, if monochromatic light sources are used for example, in particular laser light sources, provision may be made for the corresponding wavelength of the light sources to be used as the reference wavelength.

In one further refinement of the method, provision may be made for each interval length to be divided into in each case an equal number of portions of equal size, and for an image to be captured in each portion, and wherein the scaling factor is determined in dependence on the number of portions of equal size and a further number of portions, in particular wherein the further number of portions represents the assumed target width, within which the focus image distance assumes an extreme value.

In this way, the scaling factor can be formed. The scaling factor is in particular greater than 1. In other words, the "further number of portions, which represents an assumed target region" indicates to what extent the result found in a larger interval length inspires confidence in respect of the actual plane of the best image sharpness being located in this region. If, for example, the target width is set to 3, this would mean, for example, that it is assumed that the plane with the actually best image sharpness is located either directly in the portion in which the captured sharpest image is located or in a neighboring portion. This size of course is also linked to the number of the images that are to be captured per interval length at all, since the number of the sections of equal size corresponds to the number of the images to be captured. If this is very large, it could be possible to set the target width to be relatively small, since even with a large interval length the number of images and thus the resolution of the image capturing would already be relatively high. In the case of a relatively small number of images, there might be a tendency to set the target width to be greater, since owing to the lower resolution the result would be less confidence inspiring.

In one refinement of the method, provision may be made for the scaling factor to be determined pursuant to $$SF = \frac{AA}{ZB}$$

wherein SF is the scaling factor, AA is the number of portions of equal size of an interval region, and ZB is the further number of portions, with AA being greater than ZB.

The scaling factor is thus formed as a quotient from the number of the portions of equal size, in other words also the number of the images to be recorded per interval length, as long as this is specified to be constant for all interval lengths, and the target region. The target region is likewise expressed as a number of portions. This formula also illustratively gives the previously mentioned effects of the stipulation of the two parameters. If the number of the portions or the number of the images to be captured per interval length is set to be very high, the result is a relatively large scaling factor, which as a result leads to a small number of interval lengths to be traveled overall. This is because in that case, the minimum interval length is scaled using the relatively large scaling factor relatively quickly to or over the catchment region. This is also consistent, because owing to the large number of portions, relatively detailed scanning with a high resolution is performed even in the case of large interval lengths or catchment regions. This might take a long time over one interval length, but this is compensated for owing to the small number of interval lengths that are to be traveled. Accordingly, it is possible to approach the minimum interval length only very slowly in the case of only a small number of portions and thus, as a result, a small scaling factor, and an individual interval length is then traveled very quickly, but a relatively large number of interval lengths must be traveled until the minimum interval length is reached. The reverse is correspondingly true for the target region. If said target region is, at best, set to only 1, a relatively large scaling factor is produced, and the minimum interval length is reached very quickly. However, this also means that a result found in the catchment region or in large interval lengths inspires great confidence. If this inspires less confidence, a greater target region should be selected accordingly. The result is then a correspondingly smaller scaling factor, and the minimum interval length is approached only slowly. At the same time, it is correspondingly ensured in this way that a reproducible result is obtained.

In one refinement of the method, provision may be made for the number of portions of equal size of an interval length to be in a range 5≤AA≤40, preferably in a range 10≤AA≤30, with further preference to be 20, and wherein the further number of portions is in a range 1≤ZB≤5, preferably in a range 2≤ZB≤4, with further preference to be 2 or 3.

The stated ranges for the target regions can of course also be selected independently of the corresponding region specification for the number of the portions of an interval length. It has been shown that it is possible with these selection ranges for coordinate-measuring machines with optical sensors and typical working distances between 40 and 280 mm to achieve particularly good results.

In a further refinement of the method, provision may be made for a speed with which the distance between the workpiece and the optical sensor is in each case varied during the performance of the step d), to be determined in dependence on a respective interval length, a number of images to be recorded within the interval length and a maximum frame rate of the optical sensor, in particular determined pursuant to $$v = \frac{L \cdot W}{AA}$$

wherein v is the speed, L is the respective interval length, W is the frame rate, and AA is the number of images to be recorded within the interval length.

It is possible in this way to determine a maximum possible speed for traveling a respective interval length that takes account of the technical circumstances of the optical sensor, in particular its frame rate, such that the stipulated number of images can actually be captured over the interval length. In this way, the time for carrying out the method is minimized.

In one further refinement of the method, provision may be made for the image distance of the image in which the focus value assumes an extreme value to be determined directly as the focus image distance in step e).

In step e), the image distance of the image that has the best focus value is thus automatically specified as the focus image distance and thus stipulates the center of the position of the next smaller interval length.

In one further refinement of the method, provision may be made for the focus image distance in step e) to be determined by way of interpolation between two image distances by approximating a curve connecting the focus values by means of a polynomial and determining an extreme value of the polynomial, wherein an image distance, which is assigned to the extreme value and is determined by interpolation, in particular linear interpolation, is determined as the focus image distance.

It is thus also possible to carry out interpolation of the focus image distance between two captured values by approximating a curve connecting the focus values by means of a polynomial and determining the extreme value thereof. It is then possible to carry out interpolation, in particular linear interpolation, between two captured values.

In one further refinement, provision may be made for each interval length to be traveled from the starting distance to the end distance in step d).

In this case, each interval length is traveled completely. This can in particular have the advantage that a polynomial can be approximated as well as possible.

In one further refinement of the method, provision may be made in step d) for the variation in distance to be interrupted if the focus values of the captured images become smaller at least twice in succession, in particular become smaller thrice in succession.

Even during the movement it is thus possible to detect that a plane with the sharpest image was exceeded, movement can be interrupted and, even based on the ascertained plane of the sharpest image, the location of the next smaller interval length can be determined and traveled. This can speed up the method even more.

In one further refinement of the method, provision may be made for the repetition in step d) to be performed such that the variation in the distance between the workpiece and the optical sensor is carried out in alternation toward the workpiece and away from the workpiece.

It is possible in this way to again minimize the time for carrying out the method, because only a small path section between an end distance of a previous interval length to a starting distance of a next smaller interval length needs to be traveled between the individual interval lengths.

It is possible in this way with an arbitrary initial catchment size which is limited only by the maximum and minimum working distance of the lens to always obtain an optimum result for a location of the sharpest image plane. Optimum here means a best possible reproducibility of the measurement result, which is now ultimately dependent only on the magnification stage of the lens.

It goes without saying that the features mentioned above and those yet to be explained below can be used not only in the combination respectively indicated, but also in other combinations or by themselves, without departing from the scope of the present invention.

BRIEF DESCRIPTION OF THE DRAWINGS

Embodiments of the invention are illustrated in the drawing and are explained in greater detail in the following description. In the figures.

DETAILED DESCRIPTION OF THE INVENTION

Figure 1:
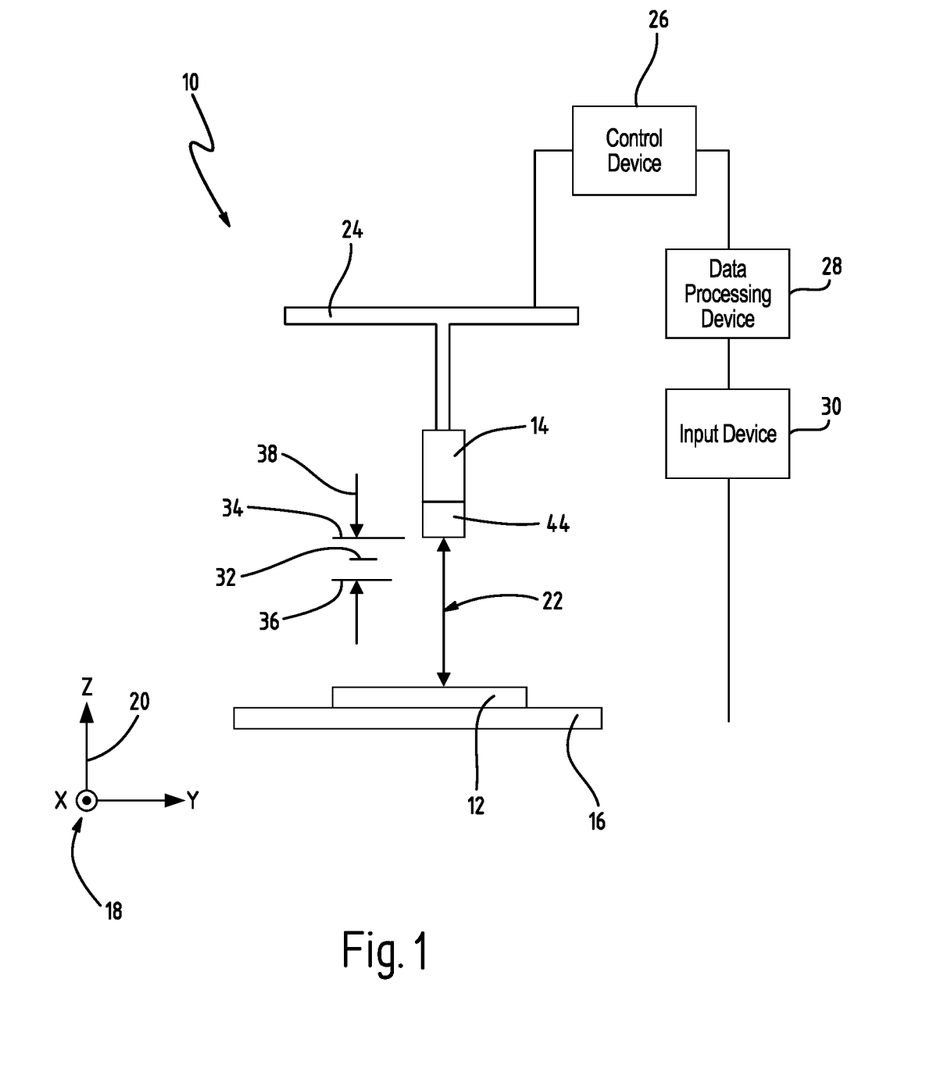
FIG. 1 shows a schematic view of an embodiment of a coordinate-measuring machine.

FIG. 1 shows a coordinate-measuring machine 10. The coordinate-measuring machine 10 serves for measuring a workpiece 12. For this purpose, the coordinate measuring machine 10 has an optical sensor 14. In addition to the optical sensor 14, further sensors can of course be provided, for example tactile sensors, which are not illustrated in the present schematic depiction, however.

The workpiece 12 to be measured is arranged for example on a table or a base plate 16. In the illustrated view, the table or the base plate is aligned in an XY plane of a coordinate system 18. A Z direction 20 extends perpendicular to the table 16. A distance between the optical sensor 14 and the workpiece 12 in the Z direction 20 is provided with a reference sign 22. The optical sensor 14 and the table 16 or the workpiece 12 are movable relative to one another. In this way, the distance 22 can be varied. In principle, provision may be made for this purpose for either the table 16 to be movable at least in a Z direction or for the optical sensor 14 to be movable, for example by means of a suitable mechanism 24, in the Z direction. The mechanism 24 can also be, for example, a portal construction or the like. The coordinate-measuring machine does not necessarily have a table setup. Provision may of course also be made for both the optical sensor 14 and the table 16 to be movable in the Z direction.

For the sake of simplicity, it is assumed in the following embodiments that the table 16 or the workpiece 12 remain fixed and that the optical sensor 14 moves in the Z direction to vary the distance 22 between the optical sensor 14 and the workpiece 12. However, this does not have to be the case.

In order to vary the distance 22 such that the optical sensor 14 is focused onto the workpiece 12, the coordinate-measuring machine 10 has a control device 26. The control device 26 is capable of moving the optical sensor 14 at a distance 22 relative to the workpiece 12 such that the images recorded by means of the optical sensor 14 have maximum sharpness. To this end, an autofocus function of the coordinate-measuring machine 10 can be triggered. Furthermore, the coordinate-measuring machine 10 has a data processing device 28 which is adapted to carry out a request for images of the optical sensor 14 and their evaluation and, based on these results, outputs a position of the optical sensor 14 in which focusing of the optical sensor 14 onto the workpiece 12 is set. This is then adjusted by the control device 26. The control device 26 and the data processing device 28 can of course also be a single unit or a single element; the data processing device 28 and the control device 26 are illustrated as separate units merely for the purposes of explanation.

Moreover, the coordinate-measuring machine 10 can have an input device 30. This can be used by a user to input into the coordinate-measuring machine 10 for example desired search regions or to manually move the optical sensor 14 and thus also to manually adjust a distance 22 between the optical sensor 14 and the workpiece 12.

At the start of a method, provision may be made for a user to adjust the optical sensor 14 approximately near an assumed focus distance 32. Starting from this assumed focused distance, a starting distance 34 and an end distance 36 are specified which define between them a catchment region 38. In the present example, the starting distance 34 is at a greater distance 22 from the workpiece 12 than the end distance 36. Of course, this can also be selected the other way round. Alternatively, provision may furthermore be made, if no user input is intended to be made at the beginning, for the starting distance 34 to be specified at a maximum possible distance 22 between the optical sensor 14 and the workpiece 12 and for the end distance 36 to be specified at a minimum possible distance 22 between the optical sensor 14 and the workpiece 12.

Figure 2A:
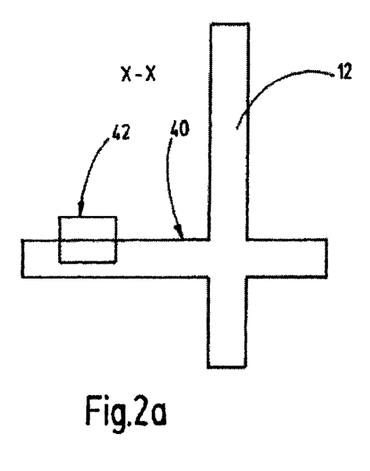
FIG. 2a shows an exemplary view of an image.

FIG. 2a shows an example of an image which is recorded by the optical sensor 14 during a focusing operation.

Figure 2B:
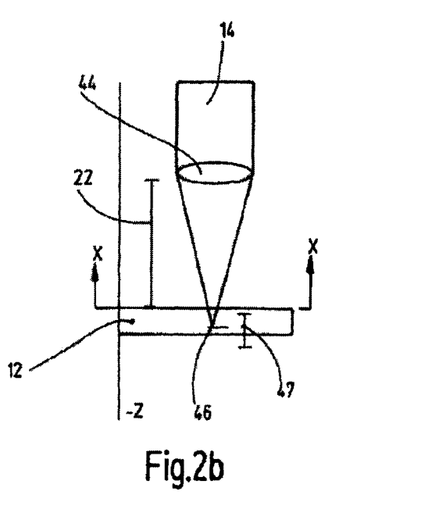
FIG. 2b shows the focusing conditions during the recording of the image in FIG. 2a, FIG. 2c shows a schematic view for explaining a focus value curve.

FIG. 2b shows the recording conditions during the recording of the image illustrated in FIG. 2a.

In the illustrated embodiment, provision may be made, for example for a bright-dark transition over an edge 40 that is visible in the image distance of the workpiece 12 to be used as a focus value. Accordingly, what is known as an "area of interest (AOI)" 42 in the image is specified, which has the edge 40 and is subsequently evaluated. In the illustrated example, the edge 40 extends horizontally through the image. Accordingly, for example a gray level gradient in the vertical direction, i.e. perpendicular to the edge 40, within the AOI 42 can be used to form the focus value. The optical sensor 14 during the recording is set at a specific distance 22 from the workpiece 12. Provision may be made, for example, for a surface of the workpiece 12 that faces the optical sensor 14 to be examined. The optical sensor 14 has a lens 44 which must be adapted and arranged for optimum focusing such that a tip 46 of a focus cone is arranged on the surface of the workpiece 12 to be observed. In the present example, the focus cone is located somewhat within the workpiece 12, i.e. the distance 22 is a little too small. A depth of field is designated 47 starting from the tip 46 of the focus cone. The image illustrated in FIG. 2a is correspondingly slightly unsharp, i.e. a bright-dark transition over the edge 40 has a relatively flat gradient. In the case of maximum sharpness, the focus cone 46 would be located on the workpiece 12. The bright-dark transition would then be more abrupt within the AOI 42 and the gradient would correspondingly be higher, such that a higher focus value would be obtained. Accordingly, in the following explanation, the focus value in the illustrated example is selected such that a greater focus value represents better focusing, a maximum focus value thus represents maximum sharpness and thus optimum focusing of the optical sensor 14 onto the workpiece 12. It is of course also possible for all other known focus values to be used alone or in combination, and in addition it may also be possible to obtain maximum sharpness or optimum focusing for a minimum focus value.

Figure 2C:
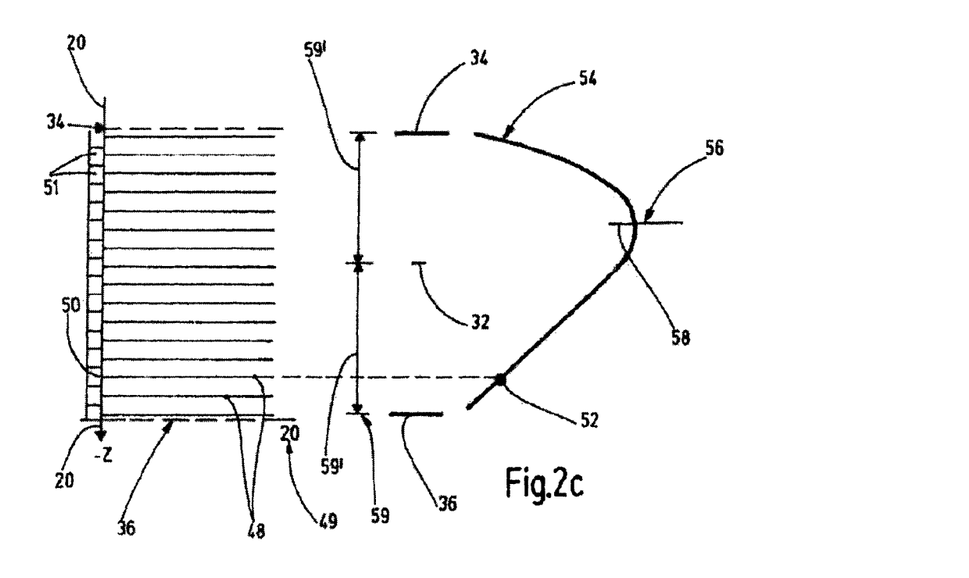

FIG. 2c schematically illustrates how a focus value curve is obtained from a recorded image stack.

While an interval length or the catchment region 38 is traveled from the starting distance 34 in the direction of the end distance 36 in a negative Z direction 20, images 48 are recorded. The number of images can vary in principle. It is dependent, inter alia, on the components used, in particular on the camera, on the size of the search region or the interval length and on the speed of travel through the search region. Provision may furthermore be made for a number of the images to be recorded to be stipulated. For example, a number of 20 can be stipulated as the value.

An image stack composed of a plurality of images 48 is thus produced. Each image 48 is assigned an image distance 50 which indicates at which image distance 50 relative to the workpiece the respective image 48 was recorded.

For each image 48, a focus value 52 is ascertained here. Obtained from the image distances 50 and the respective focus values 52 is thus a set of points which, if connected, represent a focus value curve 54. The focus value curve 54 thus extends over the entire search region 38 that is traveled. The focus value curve 54 has an extreme value 56. The focus image distance 58 associated with this extreme value 56 is consequently that distance which indicates, according to the evaluation, the best possible focusing of the optical sensor 14 onto the workpiece 12 with the maximum sharpness of the image 48 which is then recorded.

Furthermore plotted in FIG. 2c is a separation 59 between the starting distance 34 and the end distance 36. The separation 59 is divided into two portions 59 of equal length; starting from the assumed focused distance 32, which is initially set by a user, the starting distance 34 and the end distance 36 are determined such that they extend opposite one another starting from the assumed focused distance 32 in each case in the separation 59'. In the illustrated example, the starting distance 34 is further away from the workpiece than the end distance 36. Of course, this can also be selected the other way round.

FIG. 2c furthermore illustrates how an interval length between a starting distance 34 and an end distance 36 is divided into a plurality of portions 51 in which in each case an image 48 is recorded. The number of portions thus corresponds to the number of images. In each portion, one image is recorded.

Figure 3:
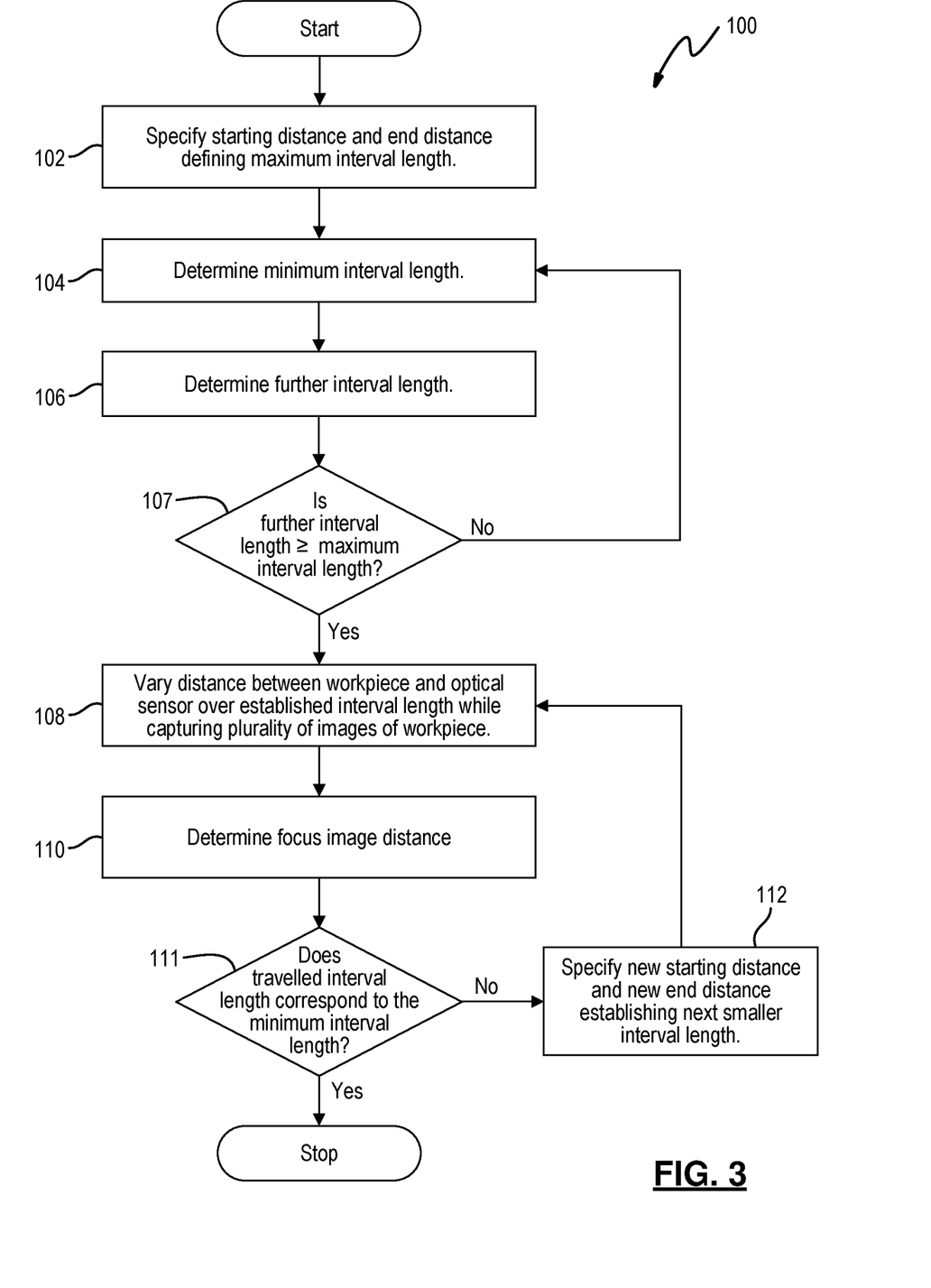
FIG. 3 shows one embodiment of a method.

FIG. 3 shows a schematic flowchart of a method 100 according to one embodiment.

After the start of the method, initially in a step 102 the catchment region 38 with the starting distance 34 and the end distance 36 is specified. The length of the catchment region corresponds to the maximum interval length. The maximum interval length is located between the starting distance 34 and the end distance 36. Subsequently, in a step 104, a minimum interval length is determined in dependence on a depth of field of the lens. A merely exemplary value for the depth of field can be around 13 μm, in which case the minimum interval length for example is approximately 40 μm.

Next, in a step 106, at least one further interval length starting from the minimum interval length is determined, wherein starting from the minimum interval length 60 in each case a next greater interval length is specified by multiplication by a scaling factor until the next greater interval length is equal to or greater than the maximum interval length. In this way, first the minimum interval length 60 is multiplied by the scaling factor, and a further interval length is obtained. In a step 107, it is subsequently queried whether the specific further interval length is equal to or greater than the maximum interval length, and if not, step 106 is repeated and a yet further interval length is determined by another multiplication by the scaling factor. This yet further interval length thus corresponds to the minimum interval length multiplied twice by the scaling factor. If the specific further interval length, however, is equal to or greater than the maximum interval length, step 107 is interrupted. If the specific further interval length is greater than the maximum interval length, this further interval length is in particular discarded and the maximum interval length is set as the interval length that is to be traveled first. In a step 108, the distance between the workpiece and the optical sensor from the current starting distance in the direction of the end distance 36 is then varied, wherein the optical sensor 14 captures a plurality of images 48 (e.g., 20) of the workpiece 12 during the varying of the distance 22, wherein each captured image 48 is assigned a focus value 52 and an image distance 50.

From this, a focus image distance 58, at which the focus value 52 between the starting distance 34 and the end distance 36 assumes an extreme value 56, is then determined in a step 110. This focus image distance 58 thus determined is the center of the next smaller interval.

Consequently, in a step 111, it is queried whether the traveled interval length in step 108 corresponds to the minimum interval length 60. If this is not the case, a new starting distance 34' and a new end distance 36' are specified, wherein the new starting distance 34' and the new end distance 36' between them have a next smaller interval length, and a center of the next smaller interval length is the focus image distance 48 determined in the previous step 110. This produces a new starting distance 34' and a new end distance 36' so as to carry out the method steps 108 and 110 again. In the process, a new focus image distance 58' is ascertained, which in turn forms the center of the next smaller interval length and so on. The steps 108, 110 and 112 are continued until it is ultimately established that the last traveled interval length was the minimum interval length 60, and the focus image distance determined here for is ultimately output as the result of the method 100.

FIG. 4 again schematically illustrates the sequence of such a method using an example. First, a catchment region 38 is set, which at the same time forms a maximum interval length. Herefor, a starting distance 34 and an end distance 36 are set. These include an assumed location of the focus image distance 32. In the extreme case, if for example the starting distance represents a maximum working distance of a lens, and the end distance 36' represents a minimum working distance of the lens, it is ensured that the assumed focus image distance 32 is located within the catchment region. A number of images to be recorded per interval length is specified, for example, to be 20. At the same time, it is specified, for example, that a target region is specified to be three portions 51. One image 48 is recorded per portion 51. A scaling factor is thus obtained from the quotient of 20:3, i.e. approximately 6.67. A depth of field 47 and a minimum interval length 60 were likewise calculated based on a stipulated magnification, for example 40 µm. As a result, the maximum interval length 65, the starting distance 34 and the end distance 36 are known. It is possible to calculate from the number of the images and a given frame rate of the optical sensor a speed 68 at which the maximum interval length 65 should be traveled in order to reliably record 20 images within a minimum time period. The minimum interval length 60 is likewise known. In principle, it is also possible here already to determine, from the length and the given number of 20 images, a speed 74 for traveling through the minimum interval length 60. What is missing is information on a starting distance 34''' and an end distance 36''' for positioning the minimum interval length. To this end, the minimum interval length 60 is multiplied first by the scaling factor, and a further minimum interval length 62 is obtained. The latter is even smaller than the maximum interval length 65. The interval length 62 is now again multiplied by the scaling factor, and the interval length 64 is obtained. The latter is in turn smaller than the maximal interval length 65. The interval length 64 is now again multiplied by the scaling factor, and the interval length 66 is obtained. However, the latter is greater than the maximum interval length 65, and as a result the determination of interval staggering can be interrupted and the interval length 66 is not used.

Figure 4:
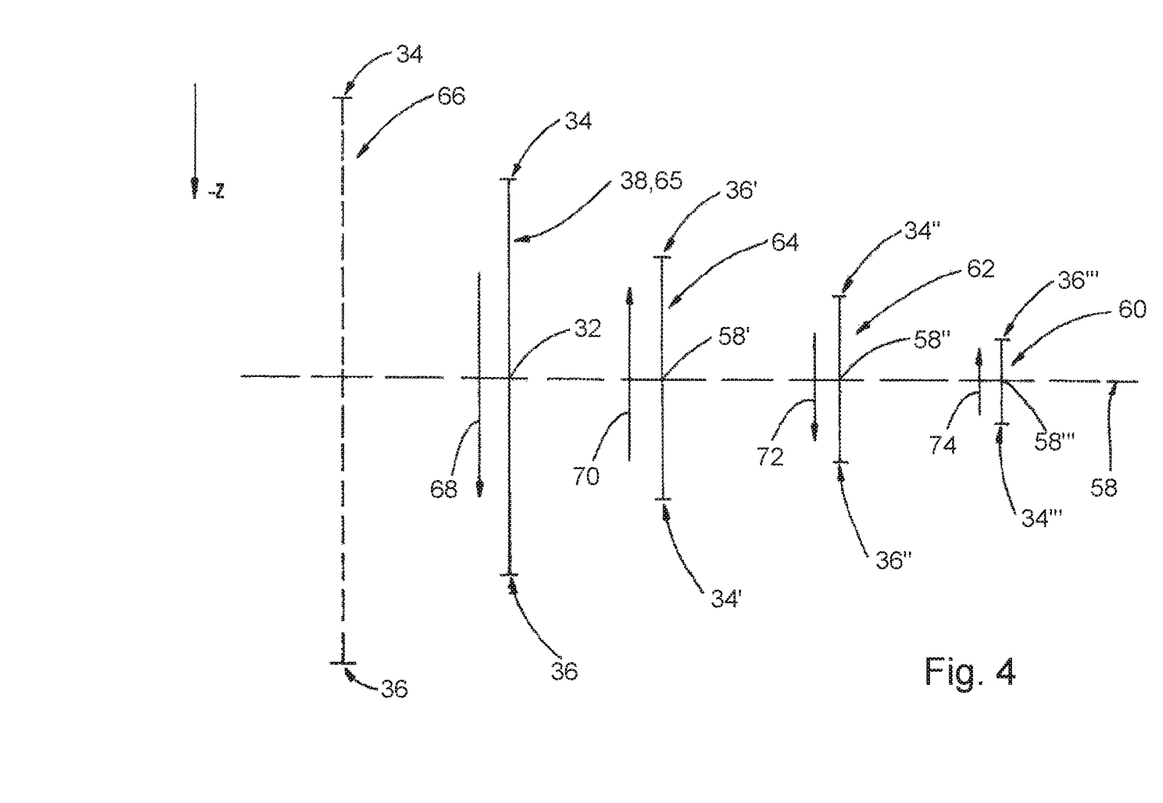
FIG. 4 shows a schematic illustration of a sequence of interval lengths.

Traveling the interval length thus starts in the maximum interval length 65 or the initially specified catchment region 38. The maximum interval length 65 is traveled from the starting distance 34 to the end distance 36 at the speed 48 and the specified number of images, specifically 20, is recorded. The image where the focus value 52 assumes an extreme value is determined, and the associated image distance 50 is specified as the focus image distance 58'. In FIG. 4, for illustrative purposes, all focus image distances 58, 58', 58'', 58''' and the assumed focus image distance 32 are arranged on one line. In principle, these can be offset with respect to one another in the Z direction. This will be the usual case in practice. Starting from the focus image distance 58', a new starting distance 34' and a new end distance 36' are then determined with the already determined interval length 64. The focus image distance 58' is here located at the center of the interval length 64. In other words, the starting distance 34' and the end distance 36' are equidistant from the focus image distance 58'. It is now possible again from the frame rate of the optical sensor 14 and the specified number of images to specify a speed 70 for traveling through the interval region 64. Provision may in particular be made for the speed 70 to be specified to be opposite the speed 68. In this way, the path that needs to be traveled from the end distance 36' to the starting distance 34' is shortened. However, in principle provision may also be made for all interval lengths to be traveled in the same direction. In other words, the speeds 68, 70, 72, 74 all have the same direction. Once again, a corresponding focus image distance 58'' is then ascertained from the images during travel through the interval length 64. Starting from the focus image distance 58'', a new starting distance 34'' and a new end distance 36'' are in turn specified with the interval length 62, the speed 72 is determined, and travel is continued through the interval region 62.

Once again, a focus image distance 58''' is ascertained, which forms the center of the next smaller interval length, specifically the minimum interval length 60. This in turn gives a new starting distance 34''' and a new end distance 36''', which are traveled at the speed 74 that is ascertained in association. In the illustrated example, owing to the equal number of images and the assumed equal frame rate owing to the reducing length of the interval lengths 60 to 65, the speeds decrease, wherein the speed 68 is the greatest speed and the speed 74 is the lowest speed. At the same time, the resolutions with which the interval lengths 60 to 65 are scanned increase among the constant number of images, since the specified number of images covers continually decreasing interval lengths.

During movement through the minimum interval length 60, finally the focus image distance 58 is ascertained. What is subsequently established is that there is no next smaller interval length, and thus the focus image distance 58 is output as the result and location of the plane with the sharpest image.

In this example, the advantages of the proposed method become clear. Starting from a catchment region of arbitrary size, it is ultimately possible to determine reproducibly and with high accuracy the location of the focus image distance 58, and to do so in a relatively short space of time. This is because it is not necessary to travel the entire catchment region at a very slow speed and high resolution, i.e. a very high number of images. Large interval lengths are first "roughly" traveled at high speed so as to ascertain centers for next smaller interval lengths. In the end, the method always leads to the minimum interval length, while ensuring that the plane of the sharpest image is actually located within this minimum interval length. Only then is it traveled at very low speed and very high resolution, i.e. with many images over the interval length. This iterative travel through the interval length ultimately results in the short time period for the total operation with high accuracy and especially high reproducibility, in particular of less than 3 μm, independently of the size of the initially selected catchment region.

Figure 5:
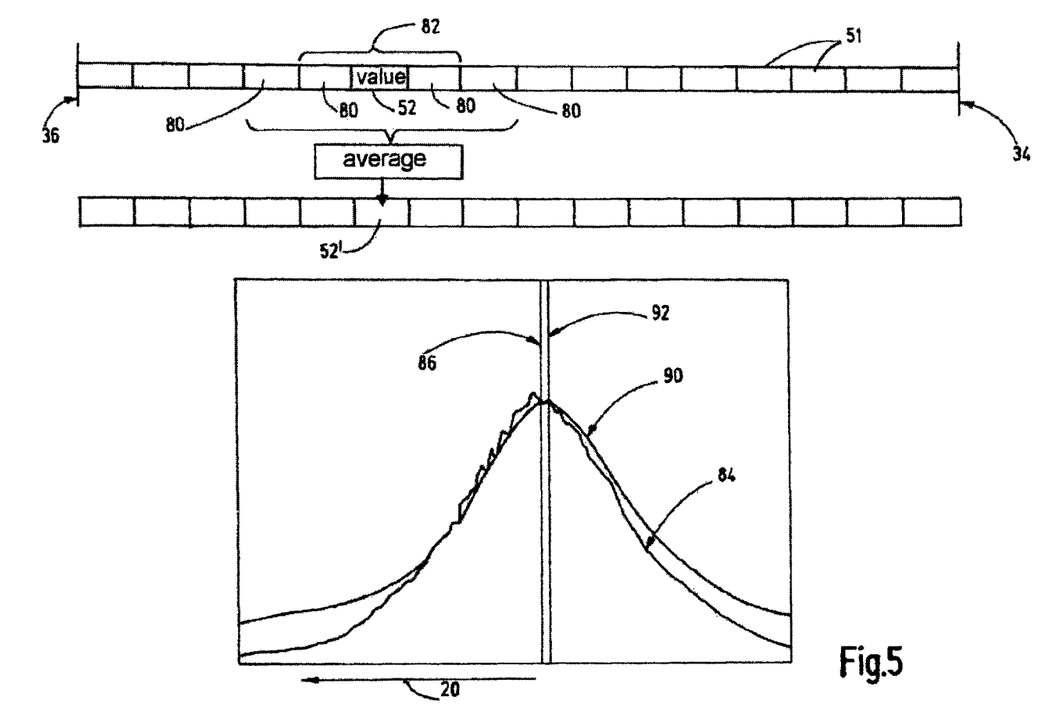
FIG. 5 shows schematic illustrations for explaining further embodiments of the method.

Finally, FIG. 5 shows different embodiments for ascertaining a focus value curve 54 or for determining the best focus value 52.

FIG. 5 shows a further possible embodiment as to how the final focus values can be determined.

Provision is made here for a focus value 52' to not correspond to the respective focus value 52 that is ascertained for the respective image, but to be an average of the respective focus value 52 and a number of m neighboring focus values 80. "Neighboring focus values" is here understood to mean the focus values that are assigned to the images recorded immediately before or later. In the illustrated example, m=2. To this extent, the final focus value 52' is determined as the average value of the focus value 52 of the respective image and the focus value of the two images 80 which are recorded later and the two images 80 which are recorded earlier.

In this way, the focus value curve is clearly smoothed. This is illustrated in the plot of FIG. 5. A typical curve in which the focus value 52' corresponds to the focus value 52 is plotted with the curve 120. A corresponding extreme value which was determined by an approximation of the curve 84 by means of a polynomial and evaluation of the extreme value of this polynomial is designated 86. Also plotted is the curve 90 which was smoothed by forming the average. A corresponding extreme value in this curve is designated 92.

As can be seen, the proposed method can result in a displacement of the ascertained extreme value and thus further increase the accuracy.

Finally, the figure also schematically shows how a target region 82 is formed from the portions 51. In the illustrated example, a value of three portions is stipulated as the target region. In other words, this means that it is assumed that the actual plane of sharpest image is located either within the portion of the focus value 52 or within one of the immediately neighboring portions 80. As a result, the higher the value for the target region is, the less confidence is attached to a respective result, based on the number of the images 51 to be recorded. As a result, a high value for the target region 82 leads to a relatively small scaling factor and therefore to a relatively slow increase or decrease of the interval lengths 60 to 65 and to a relatively high number of interval lengths that need to be traveled. Conversely, with the minimum value of 1 with respect to the target region, the scaling factor becomes relatively large, with the result that the number of interval lengths 60 to 65 that need to be traveled becomes smaller.

What is claimed is:

1. A method for ascertaining a focus image distance of an optical sensor, which is provided with a lens, of a coordinate-measuring machine onto a workpiece to be measured, wherein the optical sensor and the workpiece are movable relative to one another in a Z direction such that a distance in the Z direction between the workpiece and the optical sensor is variable, having the steps of:
   a) specifying a catchment region having a starting distance and an end distance, which have between them a maximum interval length;
   b) determining a minimum interval length in dependence on a depth of field of the lens;
   c) determining at least one further interval length starting from the minimum interval length, wherein starting from the minimum interval length in each case a next greater interval length is specified by multiplication by a scaling factor until the next greater interval length is equal to or greater than the maximum interval length;
   d) varying the distance between the workpiece and the optical sensor from the starting distance in the direction of the end distance, wherein the optical sensor captures images of the workpiece during the varying of the distance, and wherein each captured image is assigned a focus value and an image distance;
   e) determining a focus image distance at which the focus value between the starting distance and the end distance assumes an extreme value;
   f) specifying a new starting distance and a new end distance, wherein the new starting distance and the new end distance have a next smaller interval length between them, and a center of the next smaller interval length is the focus image distance determined in the previous step e);
   g) repeating steps d) to f) until a focus image distance in the minimum interval length has been determined.

2. The method as claimed in claim 1, wherein the interval length is divided into in each case an equal number of portions of equal size during step d) and an image is captured in each portion.

3. The method as claimed in claim 2, wherein the interval length is divided into in each case an equal number of portions of equal size during step d) and an image is captured in each portion in a way such that the number of captured images over each interval length is identical.

4. The method as claimed in claim 1, wherein the minimum interval length in step b) is determined pursuant to $$L_{min} = a \cdot DOF$$

wherein $L_{min}$ is the minimum interval length, a is a factor and DOF is a depth of field of the lens.

5. The method as claimed in claim 4, wherein the factor a is in a range $1 \leq a \leq 5$.

6. The method as claimed in claim 1, wherein the lens is a zoom lens which is telecentric on both sides.

7. The method as claimed in claim 4, wherein the depth of field of the lens is determined pursuant to $$DOF = \frac{\lambda}{(NA \cdot V)^2}$$

wherein DOF is the depth of field of the lens, V is the magnification of the lens, NA is the image-side numerical aperture at the magnification, and λ is a reference wavelength.

8. The method as claimed in claim 7, wherein the reference wavelength is in a range 400 nm≤λ≤650 nm.

9. The method as claimed in claim 7, wherein the reference wavelength is 550 nm.

10. The method as claimed in claim 1, wherein each interval length is divided into in each case an equal number of portions of equal size, and an image is captured in each portion, and wherein the scaling factor is determined in dependence on the number of portions of equal size and a further number of portions.

11. The method as claimed in claim 10, wherein the further number of portion represents the one assumed target width, within which the focus image distance assumes an extreme value.

12. The method as claimed in claim 1, wherein the scaling factor is determined pursuant to $$SF = \frac{AA}{ZB}$$

wherein SF is the scaling factor, AA is the number of portions of equal size of an interval region, and ZB is the further number of portions, with AA being greater than ZB.

13. The method as claimed in claim 10, wherein the number of portions of equal size of an interval length is in a range 5≤AA≤40, and wherein the further number of portions is in a range 1≤ZB≤5.

14. The method as claimed in claim 1, wherein a speed which the distance between the workpiece and the optical sensor is in each case varied during the performance of the step d), is determined in dependence on a respective interval length, a number of images to be recorded within the interval length and a maximum frame rate of the optical sensor.

15. The method as claimed in claim 14, wherein the speed is determined pursuant to $$v = \frac{L \cdot W}{AA}$$

wherein v is the speed, L is the respective interval length, W is the frame rate, and AA is the number of images to be recorded within the interval length.

16. The method as claimed in claim 1, wherein the image distance of the image in which the focus value assumes an extreme value is determined directly as the focus image distance in step e).

17. The method as claimed in claim 1, wherein the focus image distance in step e) is determined by way of interpolation between two image distances by approximating a curve connecting the focus values by means of a polynomial and determining an extreme value of the polynomial, wherein an image distance, which is assigned to the extreme value and is determined by interpolation, is determined as the focus image distance (58).

18. The method as claimed in claim 1, wherein in step d), each interval length is traveled from the starting distance to the end distance.

19. The method as claimed in claim 1, wherein in step d), the variation in distance is interrupted if the focus values of the captured images become smaller at least twice in succession.

20. The method as claimed in claim 1, wherein the repetition of step d) is performed such that the variation of the distance between the workpiece and the optical sensor is performed toward the workpiece and away from the workpiece in alternation.

21. A coordinate-measuring machine having an optical sensor and a control device for focusing the optical sensor, wherein the control device is set up for carrying out a method as claimed in claim 1.

22. A non-transitory computer readable storage medium containing a computer program which has program code means for carrying out a method as claimed in claim 1, if the computer program is executed on a coordinate-measuring machine.

* * * * *